(12) United States Patent
Choi et al.

(10) Patent No.: US 10,723,045 B2
(45) Date of Patent: Jul. 28, 2020

(54) VEHICULAR LAMP AND VEHICLE COMPRISING SAME

(71) Applicant: LG INNOTEK CO., LTD., Seoul (KR)

(72) Inventors: Young Jae Choi, Seoul (KR); Kwang Ho Park, Seoul (KR); Jae Hyuk Jang, Seoul (KR); Dong Hyun Lee, Seoul (KR); Hyun Duck Yang, Seoul (KR); Sa Rum Han, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 16/310,695

(22) PCT Filed: Jun. 13, 2017

(86) PCT No.: PCT/KR2017/006113
§ 371 (c)(1),
(2) Date: Dec. 17, 2018

(87) PCT Pub. No.: WO2017/222227
PCT Pub. Date: Dec. 28, 2017

(65) Prior Publication Data
US 2019/0143566 A1    May 16, 2019

(30) Foreign Application Priority Data
Jun. 23, 2016 (KR) .......................... 10-2016-0078668

(51) Int. Cl.
*B29C 37/00* (2006.01)
*F21K 9/65* (2016.01)
(Continued)

(52) U.S. Cl.
CPC ............ *B29C 37/005* (2013.01); *B29C 37/00* (2013.01); *B29C 45/0055* (2013.01);
(Continued)

(58) Field of Classification Search
CPC ...... F21K 9/65; F21K 9/66; F21K 9/69; G02B 27/22; F21S 43/20; F21S 43/255;
(Continued)

(56) References Cited

U.S. PATENT DOCUMENTS

| 4,722,037 A | * | 1/1988 | Davis | ...................... F21V 5/002 362/231 |
| 5,383,039 A | * | 1/1995 | Smith | .................... B60Q 1/302 359/13 |

(Continued)

FOREIGN PATENT DOCUMENTS

| DE | 20 2012 007518 | 10/2012 |
| DE | 10 2012 003200 | 8/2013 |

(Continued)

OTHER PUBLICATIONS

European Search Report dated May 22, 2019 issued in Application No. 17815640.2.

(Continued)

*Primary Examiner* — Alan B Cariaso
(74) *Attorney, Agent, or Firm* — KED & Associates LLP

(57) ABSTRACT

An embodiment relates to a vehicular lamp and a vehicle comprising the same, the vehicular lamp comprising: a lens portion; and a light source portion for emitting light toward the lens portion, wherein the lens portion comprises a body having least one curved surface and a film portion arranged on one side of the body so as to generate a 3D stereoscopic image using the light, and the lens portion is injected in an in-mold labelling (IML) type using a mold. Accordingly, the design-related degree of freedom can be improved, thereby providing an enhanced aesthetic appearance, and the manufacturing process can be simplified, thereby improving the productivity.

14 Claims, 12 Drawing Sheets

(51) Int. Cl.
| | |
|---|---|
| *F21S 43/20* | (2018.01) |
| *G02B 30/27* | (2020.01) |
| *F21V 5/00* | (2018.01) |
| *G02B 30/00* | (2020.01) |
| *B29C 45/00* | (2006.01) |
| *B29C 45/37* | (2006.01) |
| *B29L 11/00* | (2006.01) |
| *B29C 45/14* | (2006.01) |

(52) U.S. Cl.
CPC ............. *B29C 45/372* (2013.01); *F21K 9/65* (2016.08); *F21S 43/26* (2018.01); *G02B 30/00* (2020.01); *G02B 30/27* (2020.01); *B29C 2045/14918* (2013.01); *B29L 2011/00* (2013.01); *B29L 2011/0016* (2013.01); *F21V 5/003* (2013.01); *F21V 5/008* (2013.01)

(58) Field of Classification Search
CPC . F21S 43/26; F21S 43/50; F21S 43/51; F21V 5/003; F21V 5/008; F21V 5/04
See application file for complete search history.

(56) References Cited

U.S. PATENT DOCUMENTS

| | | | | |
|---|---|---|---|---|
| 5,455,747 A | * | 10/1995 | Aoyama | ............. B60Q 1/2607 362/545 |
| 5,571,277 A | * | 11/1996 | Allred | ................... B60Q 1/302 362/459 |
| 2006/0044825 A1 | | 3/2006 | Sa | |
| 2010/0214797 A1 | * | 8/2010 | Wang | ................... B60Q 1/2696 362/519 |
| 2015/0167918 A1 | | 6/2015 | Yang | |
| 2015/0219827 A1 | | 8/2015 | Kim et al. | |
| 2015/0346422 A1 | | 12/2015 | Jang et al. | |
| 2016/0229137 A1 | * | 8/2016 | Burger | ................ B29C 45/2675 |
| 2017/0349095 A1 | | 12/2017 | Wimmer et al. | |

FOREIGN PATENT DOCUMENTS

| | | |
|---|---|---|
| JP | 2007-007988 | 1/2007 |
| KR | 10-2014-0078930 | 6/2014 |
| KR | 10-1503038 | 3/2015 |
| KR | 10-2015-0071587 | 6/2015 |
| KR | 10-2015-138710 | 12/2015 |
| WO | WO 2016/071063 | 5/2016 |

OTHER PUBLICATIONS

International Search Report (with English Translation) and Written Opinion dated Sep. 15, 2017 issued in Application No. PCT/KR2017/006113.

* cited by examiner (a)  (b)

(a)　　　　　　　　　　(b)

FIG. 6
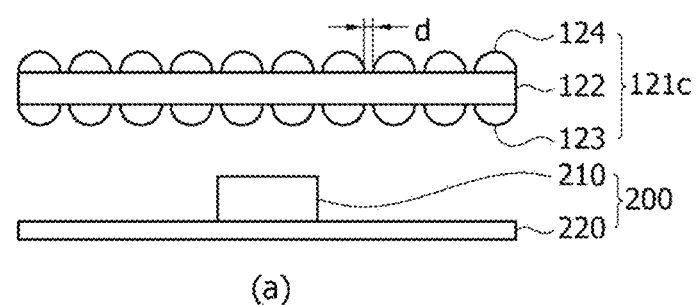
(a)
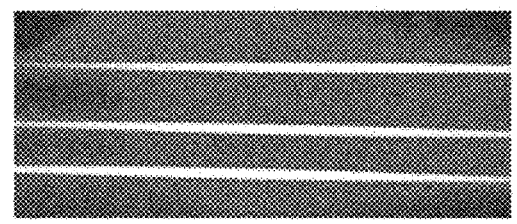
(b)
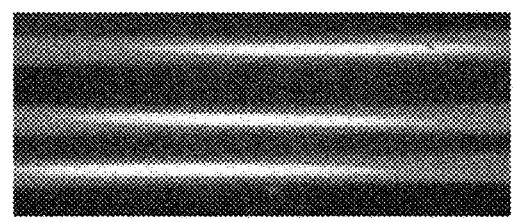
(c)

VEHICULAR LAMP AND VEHICLE COMPRISING SAME

CROSS-REFERENCE TO RELATED PATENT APPLICATIONS

This application is a U.S. National Stage Application under 35 U.S.C. § 371 of PCT Application No. PCT/KR2017/006113, filed Jun. 13, 2017, which claims priority to Korean Patent Application No. 10-2016-0078668, filed Jun. 23, 2016, whose entire disclosures are hereby incorporated by reference.

TECHNICAL FIELD

The present relates to a vehicular lamp in which a three-dimensional film is disposed and a vehicle including the same.

BACKGROUND ART

Recently, lighting apparatuses have surpassed point, line, and surface forms, and three-dimensional lighting apparatuses are being developed. For example, research and development for three-dimensional lighting apparatuses such as a three-dimensionally curled and twisted fluorescent lamp or a three-dimensional structure in which a plurality of light emitting diode (LED) light sources are disposed is being carried out after development of an incandescent lamp in the form of a point light source, a fluorescent lamp in the form of a line light source, and an LED flat light in the form of a surface light source.

The three-dimensional lighting apparatus may generally refer to that a plurality of light sources are three-dimensionally disposed and the plurality of three-dimensionally disposed light sources are turned on in various shapes. Such a three-dimensional lighting apparatus may be applied to an outer wall of a building or a vehicular lighting apparatus.

A vehicular lighting apparatus applied to some luxury vehicles includes a three-dimensional structure such as a step-like structure which is installed along a curved surface of a vehicle and in which a plurality of LED light sources are disposed and light is reflected by a mirror formed on an inner surface of the three-dimensional structure to provide illumination.

However, in a conventional vehicular three-dimensional lighting apparatus, since a plurality of LED light sources are disposed on a three-dimensional structure in order to realize three-dimensional illumination, design and manufacturing are complicated. In addition, since LED light sources which have narrow light emitting angles need to cover a wide light emitting area of a three-dimensional lighting apparatus in order to meet an illumination requirement for a vehicle, a large number of LED light sources has to be used. Therefore, there is a disadvantage in that a cost increases.

In addition, in a conventional vehicular three-dimensional lighting apparatus, since the three-dimensional lighting apparatuses are installed on a three-dimensional structure, a complex structure in which a plurality of LED light sources are densely disposed between gaps in the three-dimensional structure and a complex control process in which the plurality of LED light sources become gradually brighter or darker are required in order to generate natural three-dimensional illumination, and this environment becomes a cause of a disadvantage in that a cost increases.

DISCLOSURE

Technical Problem

The present invention is directed to providing a vehicular lamp of which a degree of design freedom is improved to enhance aesthetics and a manufacturing process is simplified to improve productivity.

In addition, the present invention is directed to providing a vehicular lamp of which a spatial utilization is improved using a film capable of forming a three-dimensional image when a three-dimensional image is formed.

Objectives to be achieved by the embodiments of the present invention are not limited to the above-described objectives, and other objectives, which are not described above, may be clearly understood by those skilled in the art through the following specification.

Technical Solution

One aspect of the present invention provides a vehicular lamp including a lens portion and a light source portion configured to emit light toward the lens portion, wherein the lens portion includes a body including at least one curved surface and a film portion disposed on one side of the body and configured to form a three-dimensional image using the light, the film portion includes a plurality of unit optical films configured to form the three-dimensional image and a base film interposed between the unit optical film and the body, and the plurality of unit optical films are disposed apart from each other by a predetermined separation distance (d2) to form a slit between the unit optical films.

The unit optical film may be printed on one side of the base film.

In addition, a separation distance (d2) between the unit optical films to form the slit on the basis of a width (W) of the unit optical film may be in a range of 0.01×W to 0.05×W, wherein W is the width of the unit optical film and d2 is the separation distance of the unit optical films.

Meanwhile, patterns configured to form the three-dimensional image may be formed on at least any one of one side and the other side of the unit optical film.

In addition, the plurality of patterns may be disposed apart from each other by a predetermined separation distance (d).

In addition, patterns configured to form the three-dimensional image may be formed on each of one side and the other side of the unit optical film, and the patterns formed on the other side may be obliquely formed at a predetermined angle with respect to a longitudinal direction of the patterns formed on one side thereof.

In addition, the plurality of patterns may be disposed apart from each other by a predetermined separation distance (d1).

Another aspect of the present invention provides a vehicular lamp including a lens portion and a light source portion configured to emit light toward the lens portion, wherein the lens portion includes a body having at least one curved surface and a film portion disposed on one side of the body and configured to form a three-dimensional image using the light; the film portion includes a plurality of first unit optical films configured to form the three-dimensional image, a plurality of second unit optical films configured to form the three-dimensional image, and a base film; and the first unit optical film and the second unit optical film are disposed apart from each other by a predetermined separation distance (d3) on one side of the base film.

The first unit optical film disposed on one side of the base film may be formed in at least one shape among a triangular shape, a rectangular shape, and a trapezoidal shape.

In addition, patterns configured to form the three-dimensional image may be formed on at least one of one side and the other side of each of the first unit optical film and the second unit optical film.

In addition, the plurality of patterns may be disposed apart from each other by a predetermined separation distance (d).

In addition, patterns configured to form the three-dimensional image may be formed on one side and the other side of each of the first unit optical film and the second unit optical film, and the patterns formed on the other side may be obliquely formed at a predetermined angle with respect to a longitudinal direction of the patterns formed on one side thereof.

In addition, the plurality of patterns may be disposed apart from each other by a predetermined separation distance (d1).

Still another aspect of the present invention provides a vehicular lamp including a lens portion and a light source portion configured to emit light toward the lens portion, wherein the lens portion includes a body having at least one curved surface and a film portion disposed on one side of the body and configured to form a three-dimensional image using the light, and the lens portion is injection molded through in-mold labelling (IML) using a mold.

The film portion may include an optical film configured to form the three-dimensional image and a base film interposed between the optical film and the body.

In addition, patterns configured to form the three-dimensional image may be formed on at least any one of one side and the other side of the optical film.

In addition, the plurality of patterns may be disposed apart from each other by a predetermined separation distance (d).

In addition, in a case in which the patterns configured to form the three-dimensional image are formed on one side and the other side of the optical film, the patterns formed on the other side may be obliquely formed at a predetermined angle with respect to a longitudinal direction of the patterns formed on one side thereof.

In addition, the plurality of patterns may be disposed apart from each other by a predetermined separation distance (d1).

Meanwhile, an adhesive layer may be further interposed between the base film and the body to improve adhesion by which the base film is adhered to the body.

In addition, the vehicular lamp may further include a protection film disposed on one side of the optical film and configured to protect the optical film.

In addition, a reflective layer may be further interposed between the optical film and the protection film to improve a reflectivity to enhance a light efficiency of the light.

In addition, an oxidation prevention film may be further interposed between the reflective layer and the protection film to prevent oxidation of the reflective layer which contains aluminum or silver.

Here, the oxidation prevention film may contain silicon or stainless steel.

Yet another aspect of the present invention provides a vehicle including a housing, a lens portion, and a light source portion configured to emit light toward the lens portion, wherein the lens portion includes a body having at least one curved surface and a film portion disposed on one side of the body and configured to form the three-dimensional image using the light, and the lens portion is injection molded through an IML using a mold.

The light source portion may be disposed on at least any one location of one side and the other side of the body, and light emitted by the light source portion may transmit through the body and be emitted toward the film portion.

Advantageous Effects

According to embodiments, since a vehicular lamp having the above-described configuration according to the embodiment uses a film capable of forming a three-dimensional image, a degree of design freedom can be improved to enhance aesthetics, and a manufacturing process can be simplified to improve productivity.

In addition, since the vehicular lamp according to the embodiment uses the film capable of forming the three-dimensional image, a degree of arrangement freedom of a light source can be improved. Accordingly, a spatial utilization of the vehicular lamp according to the embodiment can be improved from that of a conventional vehicular lamp using a three-dimensional structure.

Meanwhile, a lens portion of the vehicular lamp may be formed by injection molding through an in-mold labelling (IML) method using a mold. Therefore, since injected objects for forming variously designed lens portions can be formed by only changing optical films configured to form three-dimensional images, the lens portion can be applied to a design of the vehicular lamp which is largely changed.

In addition, since the vehicular lamp is manufactured through the IML method, a curved surface in the vehicular lamp is advantageous for being injection molded.

DESCRIPTION OF DRAWINGS

FIG. 6 is a view illustrating a third example in which the light source portion and the patterns of the optical film of the vehicular lamp according to the embodiment are formed on one side and the other side of the optical film.

MODES OF THE INVENTION

Figure 1:
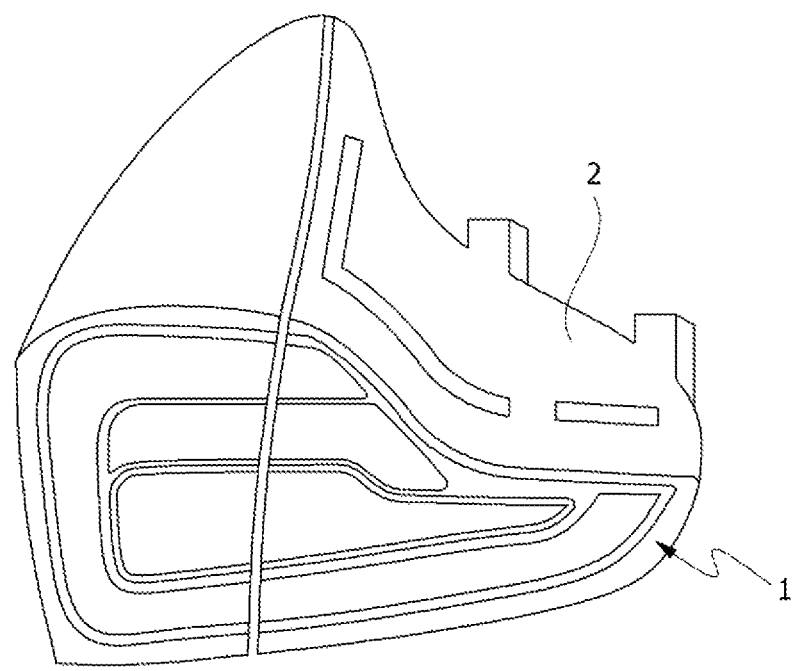
FIG. 1 is a perspective view illustrating a vehicular lamp according to an embodiment.
Figure 2:
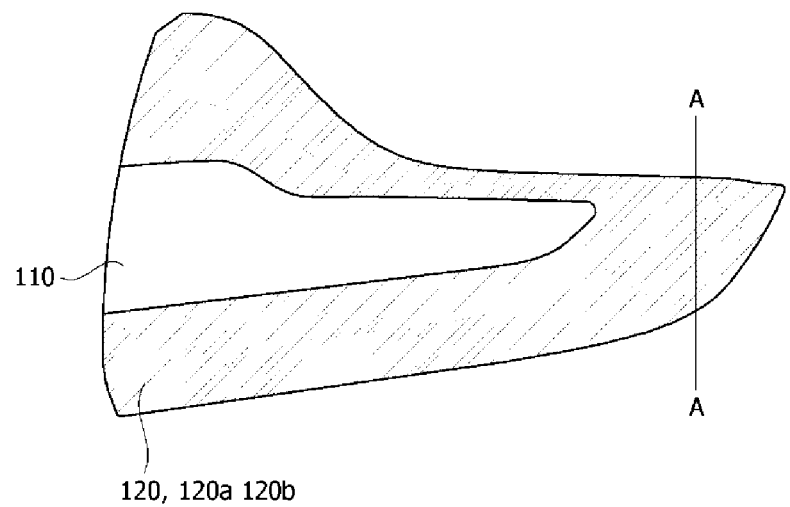
FIG. 2 is a view illustrating a lens portion of the vehicular lamp according to the embodiment.

As the invention allows for various changes and numerous embodiments, specific embodiments will be illustrated in the drawings and described in detail in the written description. However, this is not intended to limit the present invention to specific modes of practice, and it is to be appreciated that all changes, equivalents, and substitutes that do not depart from the spirit and technical scope of the present invention are encompassed in the present invention.

It will be understood that, although the terms "first," "second," etc. may be used herein to describe various elements, these elements should not be limited by these terms. These terms are only used to distinguish one element from another. For example, a first element could be termed a second element, and a second element could similarly be termed a first element without departing from the scope of the present invention. As used herein, the term "and/or" includes combinations or any one of a plurality of associated listed items.

It will be understood that when an element is referred to as being "connected" or "coupled" to another element, it can be directly connected or coupled to another element or intervening elements may be present. In contrast, when an element is referred to as being "directly connected" or "directly coupled" to another element, there are no intervening elements.

In a description of the embodiment, in a case in which any one element is described as being formed on (or under) another element, such a description includes both a case in which the two elements are formed to be in direct contact with each other and a case in which the two elements are in indirect contact with each other such that one or more other elements are interposed between the two elements. In addition, when in a case in which one element is described as being formed on (or under) another element, such a description may include a case in which the one element is formed on an upper side or a lower side with respect to another element.

The terminology used herein is for the purpose of describing particular embodiments only and is not intended to be limiting to the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, components, and/or groups thereof but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined here.

Example embodiments of the invention will be described below in more detail with reference to the accompanying drawings. Components that are the same or are corresponding to each other are rendered with the same reference numeral regardless of the figure number, and redundant description will be omitted.

A vehicular lamp 1 according to an embodiment may use a film capable of forming a three-dimensional image to improve a degree of design freedom of the vehicular lamp to enhance aesthetics.

In addition, since a three-dimensional image is formed using the film which occupies a small space in the vehicular lamp 1, a manufacturing process becomes simple, and a spatial utilization can be improved when the vehicular lamp 1 is installed in a vehicle.

Referring to FIGS. 1 to 15, the vehicular lamp 1 may include a lens portion 100, 100a, or 100b, and a light source portion 200. Here, the lens portion 100, 100a, or 100b may include a body 110 having at least one curved surface and a film portion 120, 120a, or 120b configured to form a three-dimensional image using light emitted by the light source portion 200.

Accordingly, the light source portion 200 may emit the light toward the lens portion 100, 100a, or 100b. Therefore, the lens portion 100, 100a, or 100b may be disposed on a line along which the light is emitted by the light source portion 200.

Here, a light emitting diode (LED) may be used as a light source 210 of the light source portion 200. In addition, the light source 210 may be disposed on a printed circuit board (PCB) 220 to receive power.

Meanwhile, the lens portion 100 illustrated in FIGS. 3 to 7 may be formed by injection molding through an in-mold labelling (IML) method using a mold.

The IML, method used when the lens portion 100 is formed is a method in which a thermally shaped film is cut and inserted into the mold and the body 110 is injection molded. Therefore, the film portion 120 may be easily disposed in the body 110 in which curved surfaces are formed on both edge portions. Therefore, a delamination phenomenon occurring between the body 110 and the film portion 120 due to the curved surfaces can be prevented.

The body 110 may be formed to include at least one curved surface. Here, the body 110 may form an exterior of the lens portion 100 and may be formed of a plastic material. For example, the body 110 may be formed of a resin, and the resin may include polycarbonate (PC), polymethyl methacrylate (PMMA), or the like.

Figure 14:
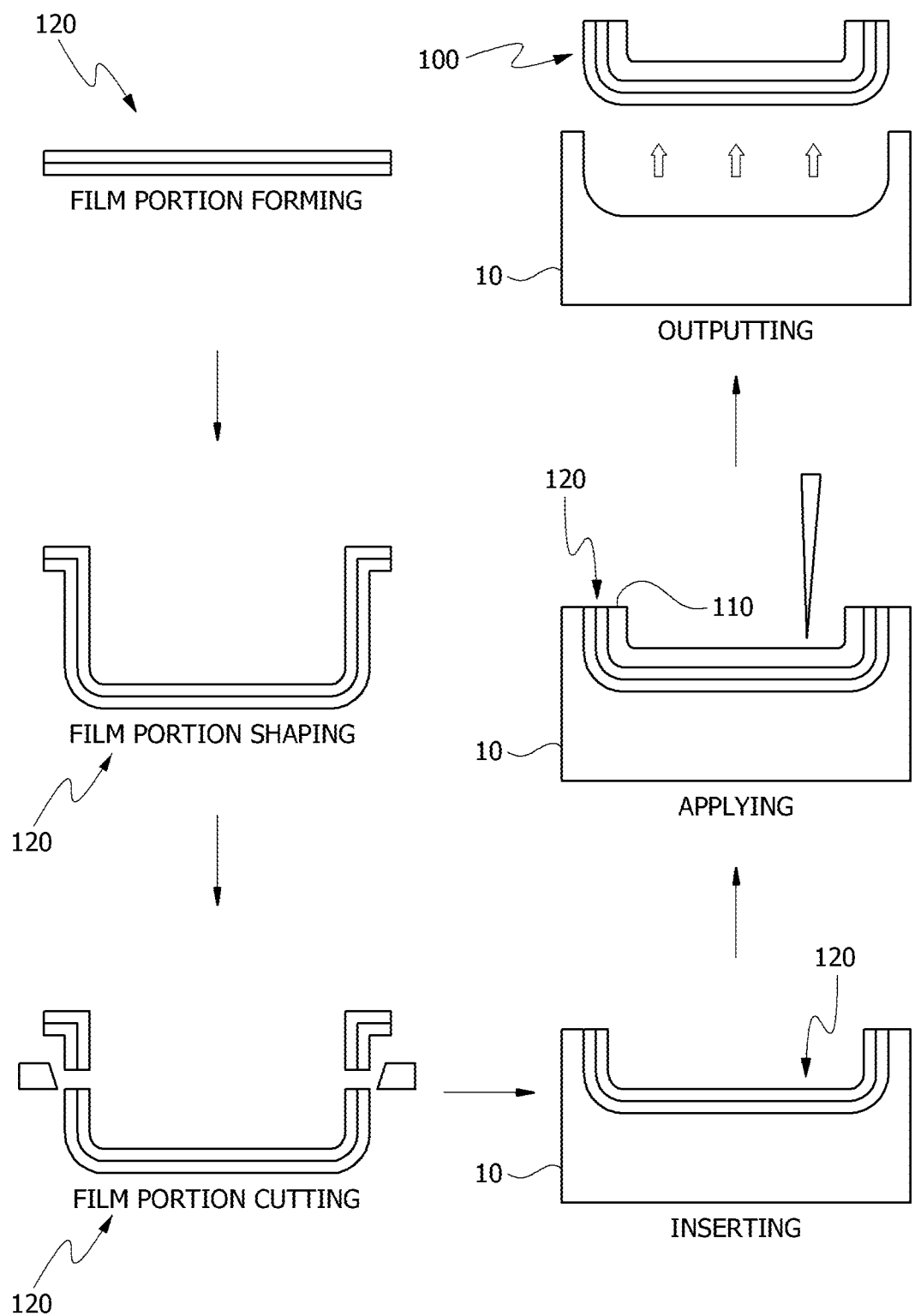
FIG. 14 is a view illustrating the process of manufacturing the lens portion of the vehicular lamp according to the embodiment.

As illustrated in FIG. 14, the body 110 may be formed by inserting the thermally shaped and cut film portion 120 into the mold and applying the resin on the film portion 120.

Figure 3:
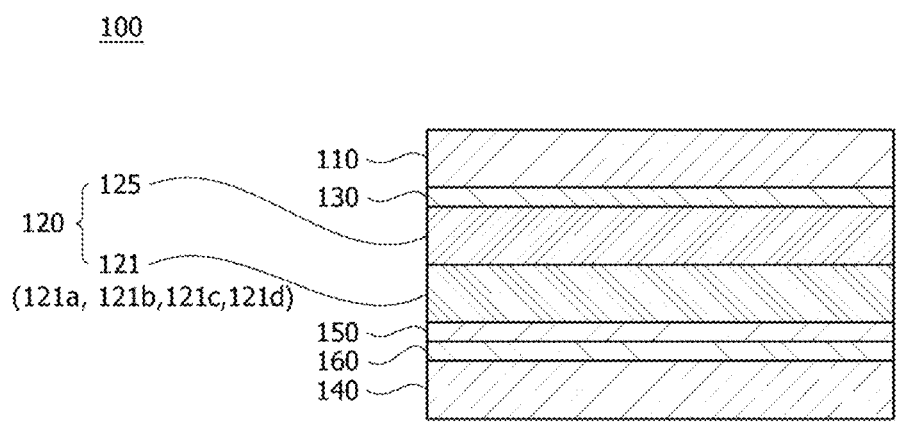
FIG. 3 is a view illustrating a structure of the lens portion taken along line A-A of FIG. 2.

Referring to FIG. 3, the film portion 120 of the lens portion 100 may include an optical film 121 and a base film 125.

The optical film 121 may form a three-dimensional image using the light.

Here, the optical film 121 may be formed on the base film 125 through a printing method.

In addition, in order to form a three-dimensional image, patterns 123, 124, or 124a configured to form a three-dimensional image may also be formed on at least any one of one side and the other side of the optical film body 122 constituting the optical film 121. In addition, the patterns 123, 124, or 124a may be formed on at least any one of one side and the other side of the optical film body 122 through a printing method.

Hereinafter, in the case of the optical film 121 including the optical film body 122 and the patterns 123, 124, or 124a, since various examples may be proposed according to an arrangement position of the patterns 123, 124, or 124a, the examples will be described below. For example, the optical film 121 may be formed as an optical film 121a according to a first example, an optical film 121b according to a second example, an optical film 121c according to a third example, and an optical film 121d according to a fourth example on the basis of an arrangement position and a direction of the patterns 123, 124, or 124a.

Figure 4:
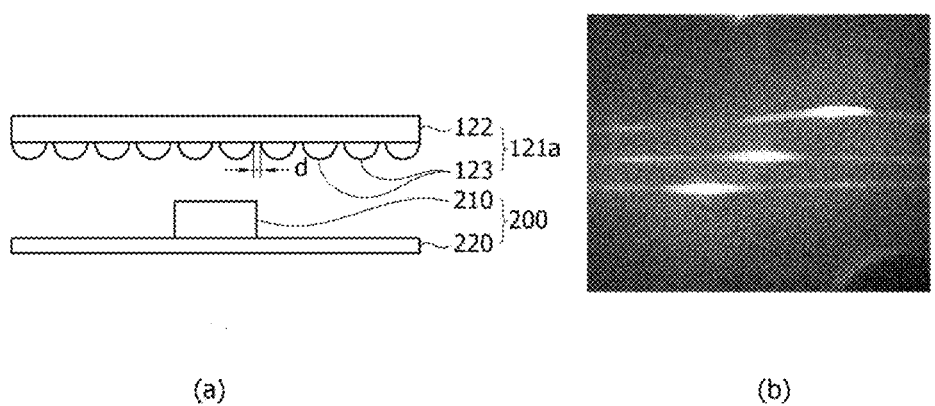
FIG. 4 is a view illustrating a first example in which a light source portion and patterns of an optical film of the vehicular lamp according to the embodiment are disposed on a side of the light source portion.

FIG. 4 is a view illustrating the first example in which the light source portion and patterns of the optical film of the vehicular lamp according to the embodiment are disposed on a side of the light source portion. FIG. 4A is a view illustrating an arrangement of the light source portion and the patterns of the optical film of the vehicular lamp according to the first example of the optical film, and FIG. 4B is a view illustrating an optical image of the lens portion according to the FIG. 4A.

FIG. 4 is the view illustrating the first example of the optical film 121a according to a position at which the patterns are formed, and in the first example, the patterns 123 may be formed on one side of the optical film body 122 as illustrated in FIG. 4A.

The patterns 123 of the optical film 121a may be disposed on the optical film body 122 to face the light source 210 of the light source portion 200. Here, the light source 210 may be disposed apart from the patterns 123.

In addition, the plurality of patterns 123 disposed on one side of the optical film body 122 may be disposed apart from each other by a predetermined separation distance d. Here, the patterns 123 may be longitudinally formed in a predetermined direction.

Therefore, as illustrated in FIG. 4B, the optical image of the lens portion may be formed by the optical film 121a. That is, one portion of the optical image may be bright due to the patterns 123, and a position at which the light source 210 is disposed may be brighter.

Figure 5:
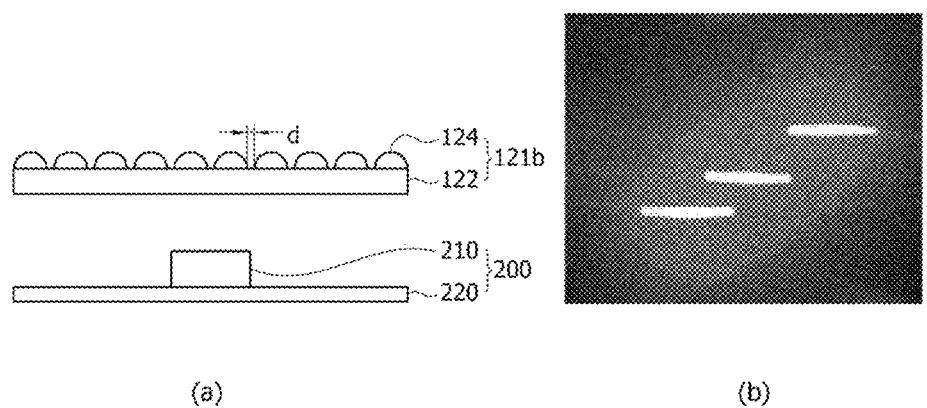
FIG. 5 is a view illustrating a second example in which the light source portion and the patterns of the optical film of the vehicular lamp according to the embodiment are disposed on a side opposite the light source portion.

FIG. 5 is a view illustrating the second example in which the light source portion and the patterns of the optical film of the vehicular lamp according to the embodiment are disposed on a side opposite the light source portion. FIG. 5A is a view illustrating an arrangement of the light source portion and the patterns of the optical film of the vehicular lamp according to the second example, and FIG. 5B is a view illustrating an optical image of the lens portion according to FIG. 5A.

As illustrated in FIG. 5A, the patterns 124 of the optical film 121b may be disposed on the other side of the optical film body 122 with respect to the light source 210 of the light source portion 200.

For example, as illustrated in FIG. 5A, the plurality of patterns 124 disposed on the other side of the optical film body 122 may be disposed apart from each other by a predetermined separation distance d.

Therefore, as illustrated in FIG. 5B, the optical image of the lens portion may be formed by the optical film 121b. When the optical image is compared with the optical image formed by the optical film 121 according to the first example, since there is a difference in the separation distance from the light source 210 to the patterns 124 between the optical film 121 and the optical film 121b according to the second example, the optical image formed by the optical film 121b according to the second example is different from the optical image of the optical film 121 according to the first example.

FIG. 6 is a view illustrating the third example in which the light source portion and the patterns of the optical film of the vehicular lamp according to the embodiment are formed on one side and the other side of the optical film. FIG. 6A is a view illustrating an arrangement of the light source portion and the patterns of the optical film of the vehicular lamp according to the third example, and FIGS. 6B and 6C are views illustrating optical images of the lens portion according to FIG. 6A.

As illustrated in FIG. 6A, according to the third example of the optical film 121c, patterns 123 and 124 may be formed on one side and the other side of the optical film body 122.

Therefore, as illustrated in FIGS. 6B and 6C, the optical images of the lens portion may be formed by the optical film 121c. Here, in the case of the optical images of the lens portion illustrated in FIG. 6C, the separation distance d between the patterns 123 and 124 is greater than the separation distance d between those of FIG. 6B.

That is, various optical images may be formed according to the separation distance d between the patterns 123 and 124.

Figure 7:
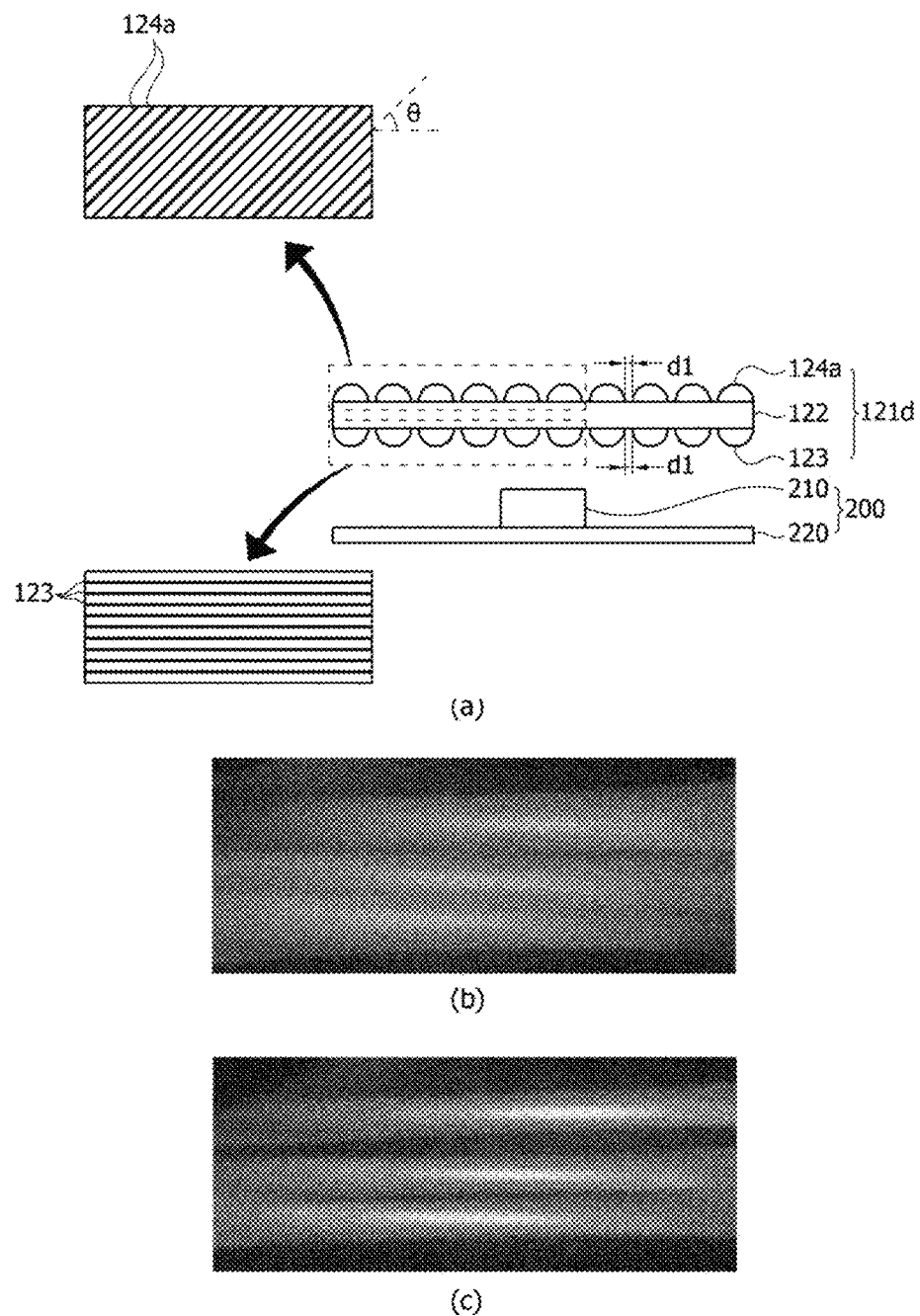
FIG. 7 is a view illustrating a fourth example in which the light source portion and the patterns of the optical film of the vehicular lamp according to the embodiment are formed on one side and the other side of the optical film, and directions of the patterns are different.

FIG. 7 is a view illustrating the fourth example in which the light source portion and the patterns of the optical film of the vehicular lamp according to the embodiment are formed on one side and the other side of the optical film, and directions of the patterns are different. FIG. 7A is a view illustrating an arrangement of the light source portion and the patterns of the optical film of the vehicular lamp according to the fourth example, and FIGS. 7B and 7C are views illustrating optical images of the lens portion according to FIG. 7A.

As illustrated in FIG. 7A, according to the fourth example of the optical film 121d, the patterns 123 and 124a are formed on one side and the other side of the optical film body 122, and the patterns 123 and 124a may be formed in different directions. Here, the patterns 123 may be disposed on the optical film body 122 to face the light source 210, but are not limited thereto.

Here, the plurality of patterns 123 and 124a formed on one side and the other side of the optical film body 122 may be disposed apart from each other by a predetermined separation distance d1.

That is, the patterns 123 and 124a configured to form a three-dimensional image may be formed on one side and the other side of the optical film 121d. In addition, the patterns 124a formed on the other side may be disposed to intersect with the patterns 123 formed on one side in a longitudinal direction when seen from a line along which the light is emitted.

As illustrated in FIG. 7A, in the case of the patterns 124a disposed on the other side of the optical film body 122, the patterns 124a may be obliquely disposed at a predetermined angle with respect to the patterns 123 disposed on one side of the optical film body 122.

Therefore, the optical images of the lens portion illustrated in FIGS. 7B and 7C may be formed. Here, the optical image of the lens portion illustrated in FIG. 7C shows that a separation distance d1 between the patterns 123 and 124a illustrated in FIG. 7B is greater than the separation distance d1 between the patterns 123 and 124a illustrated in FIG. 7C.

That is, a light scattering effect at an edge of the optical image formed by the optical film 121d according to the fourth example is further improved from that of the optical image formed by the optical film 121c according to the third example so that a smooth optical image can be formed.

Referring to FIG. 3, the lens portion 100 may include an adhesive layer 130.

The adhesive layer 130 may be interposed between the body 110 and the base film 125. In addition, the adhesive layer 130 enhances adhesion by which the base film 125 is adhered to the body 110. For example, a primer of the adhesive layer 130 may be the same as a material of the body 110.

Meanwhile, the lens portion 100 may further include a protection film 140 disposed on one side of the optical film 121. As illustrated in FIG. 3, the protection film 140 may be disposed on a side opposite the optical film body 122 with the optical film 121 interposed therebetween.

The protection film 140 may prevent the optical film 121 from being damaged due to an external force, a high temperature, a high humidity, and the like which are externally applied. Here, the protection film 140 may be formed of a material which is resistant against heat, humidity, and the like.

In addition, since a plurality of unit optical films 126, 128, or 129 may be disposed on one side of the base film 125 instead of the optical film 121, the protection film 140 may also prevent the unit optical films 126, 128, or 129 from being damaged due to an external force, a high temperature, a high humidity, and the like which are externally applied.

In addition, the lens portion 100 may further include a reflective layer 150 configured to increase an optical efficiency of the light by enhancing a reflectivity.

As illustrated in FIG. 3, the reflective layer 150 may be interposed between the optical film 121 and the protection film 140. In addition, the reflective layer 150 may also be interposed between the plurality of unit optical films 126, 128, or 129 and the protection film 140.

Here, the reflective layer 150 may be formed of a material containing aluminum or silver. In addition, the reflective layer 150 may also be disposed as a film type.

In addition, the lens portion 100 may further include an oxidation prevention film 160 which prevents oxidation of the reflective layer 150.

As illustrated in FIG. 3, the oxidation prevention film 160 may be interposed between the protection film 140 and the reflective layer 150.

Here, the oxidation prevention film 160 may prevent the oxidation of the reflective layer 150 to improve reliability against a high temperature and a high humidity, and the like. In addition, the oxidation prevention film 160 may contain silicon or stainless steel.

In addition, the oxidation prevention film 160 may be formed through a deposition method.

Figure 8:
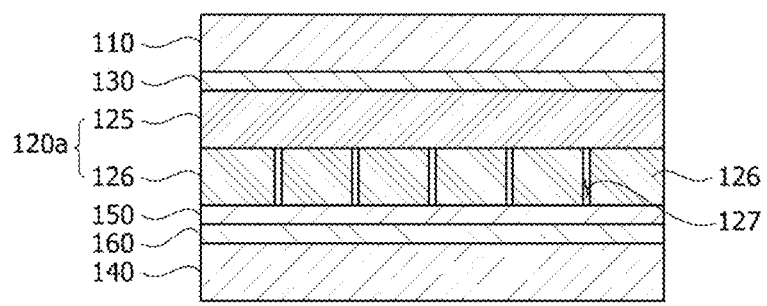
FIG. 8 is a view illustrating another example of the lens portion disposed in the vehicular lamp according to the embodiment.
Figure 9:
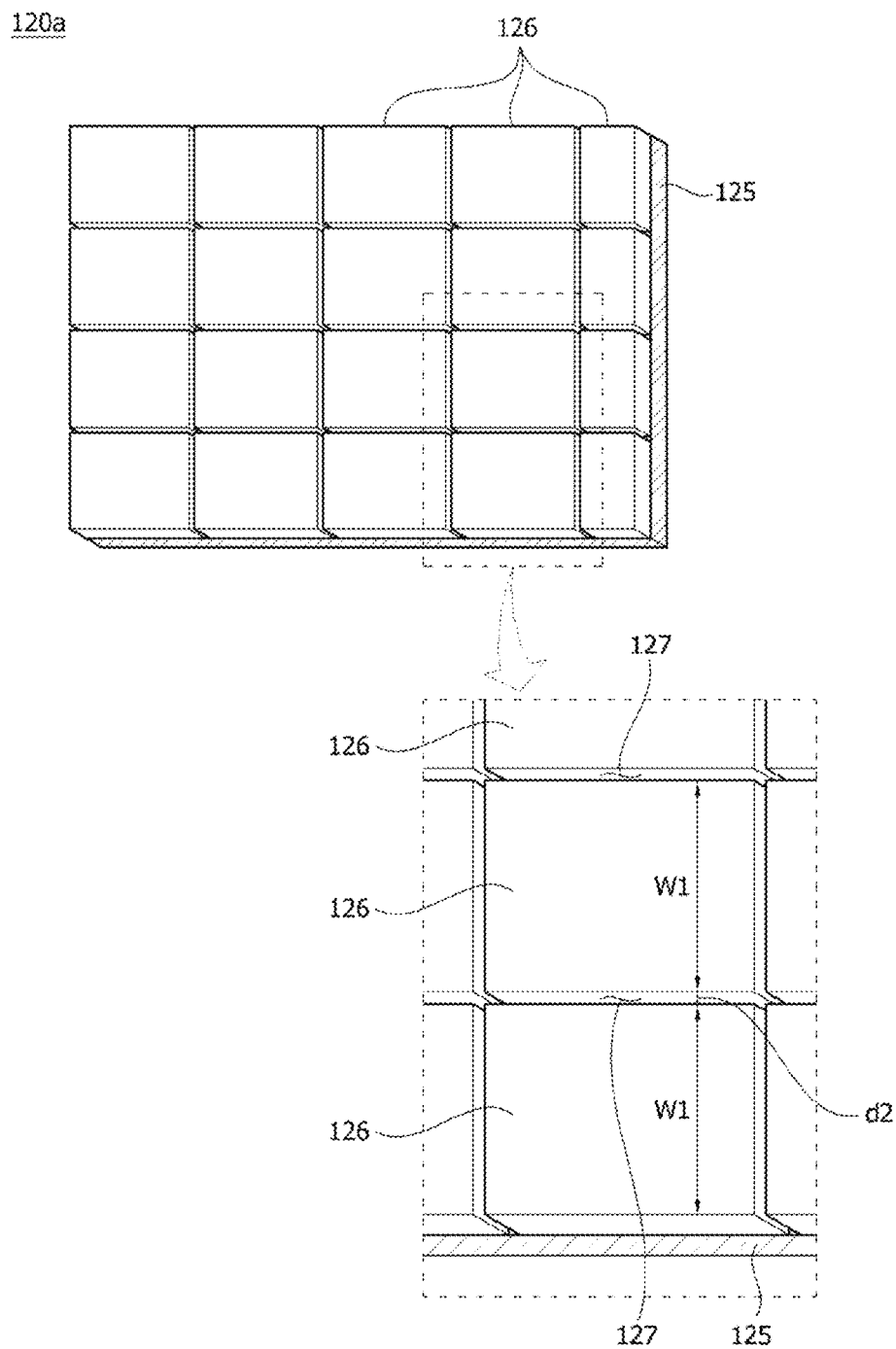
FIG. 9 is a view illustrating a base film and a plurality of unit optical films of the vehicular lamp according to the embodiment.

FIG. 8 is a view illustrating a lens portion disposed in a vehicular lamp according to another embodiment, and FIG. 9 is a view illustrating a base film and a plurality of unit optical films of the vehicular lamp according to the embodiment.

When the lens portion 100a is described with reference to FIGS. 8 and 9, components of the lens portion 100a which are the same as those of the lens portion 100 are described with numerals which are the same as those of the components of the lens portion 100, and specific descriptions thereof will be omitted.

The lens portion 100a may be formed by injection molding through an IML method using a mold.

The lens portion 100a may include a body 110 and the film portion 120a.

That is, there is a difference in a shape of a film portion between the lens portion 100 and the lens portion 100a according to the different embodiments.

Referring to FIG. 9, the film portion 120a of the lens portion 100a may also include the base film 125 and the plurality of unit optical films 126 disposed on one side of the base film 125 and spaced apart from each other. Here, the film portion 120a may be disposed instead of the film portion 120 illustrated in FIG. 3.

Here, the unit optical films 126 may be formed on the base film 125 through a printing method.

In addition, the plurality of unit optical films 126 may also include the optical film body 122 and patterns 123, 124, or 124a formed on at least any one of one side and the other side of the optical film body 122 as described above.

In addition, the patterns 123, 124, or 124a may be formed on at least any one of one side and the other side of the optical film body 122 through a printing method.

As illustrated in FIG. 9, the plurality of unit optical films 126 may be disposed apart from each other by a predetermined separation distance d2. Therefore, slits 127 may be formed between the unit optical films 126.

Here, the slits 127 are formed to allow an expanding surface of the unit optical film 126 to expand.

For example, in a case in which one optical film 121 is disposed on the base film 125, a phenomenon in which the optical film 121 is delaminated from the base film 125 due to heat may occur. Accordingly, the delamination phenomenon of the film portion 120a due to the heat may be prevented using the unit optical films 126 disposed apart from each other.

Figure 10:
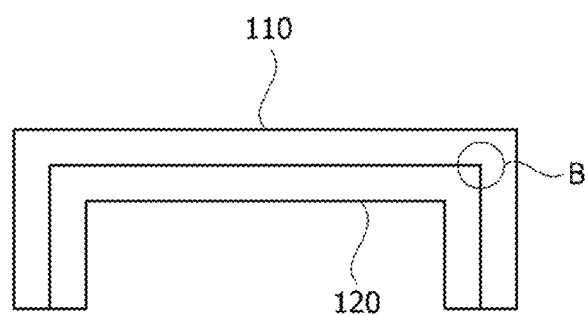
FIG. 10 is a cross-sectional view illustrating the lens portion of the vehicular lamp according to the embodiment.

In addition, as illustrated in FIG. 10, since the body 110 may have at least one curved surface or corner, the film portion 120 may be folded inward at a region B. Therefore, a phenomenon in which the optical film 121 is delaminated from the base film 125 at the region B may occur.

Accordingly, the delamination phenomenon of the film portion 120a due to the folding may be prevented using the unit optical films 126 disposed apart from each other.

That is, the unit optical films 126 should be disposed so as to maintain the predetermined separation distance d2.

The separation distance d2 between the unit optical films 126 for forming the slits 127 may be in the following range based on a width W of the unit optical film. Therefore, the lens portion 100a may secure an illuminance while allowing the unit optical films 126 to expand.

d2 is in the range of 0.01×W to 0.05×W.

W is a width of a unit optical film, and d2 is a separation distance between the unit optical films.

For example, when the width W of the unit optical film 126 is 1, the separation distance d2 between the unit optical films 126 in which the slits 127 are formed may be in the range of 0.01 to 0.05 in consideration of the above-described delamination phenomenon.

Meanwhile, as illustrated in FIG. 8, the lens portion 100a may further include the adhesive layer 130, the protection film 140, the reflective layer 150, and the oxidation prevention film 160.

Figure 11:
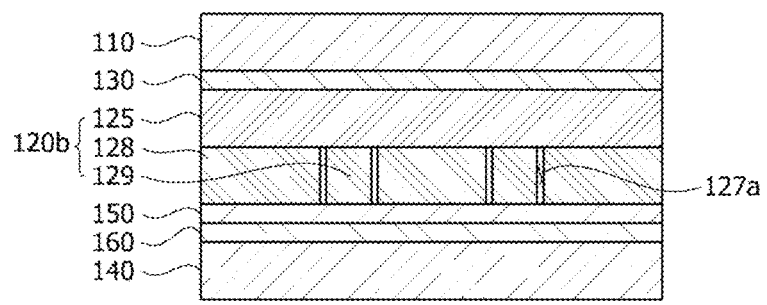
FIG. 11 is a view illustrating still another example of the lens portion disposed in the vehicular lamp according to the embodiment.
Figure 12:
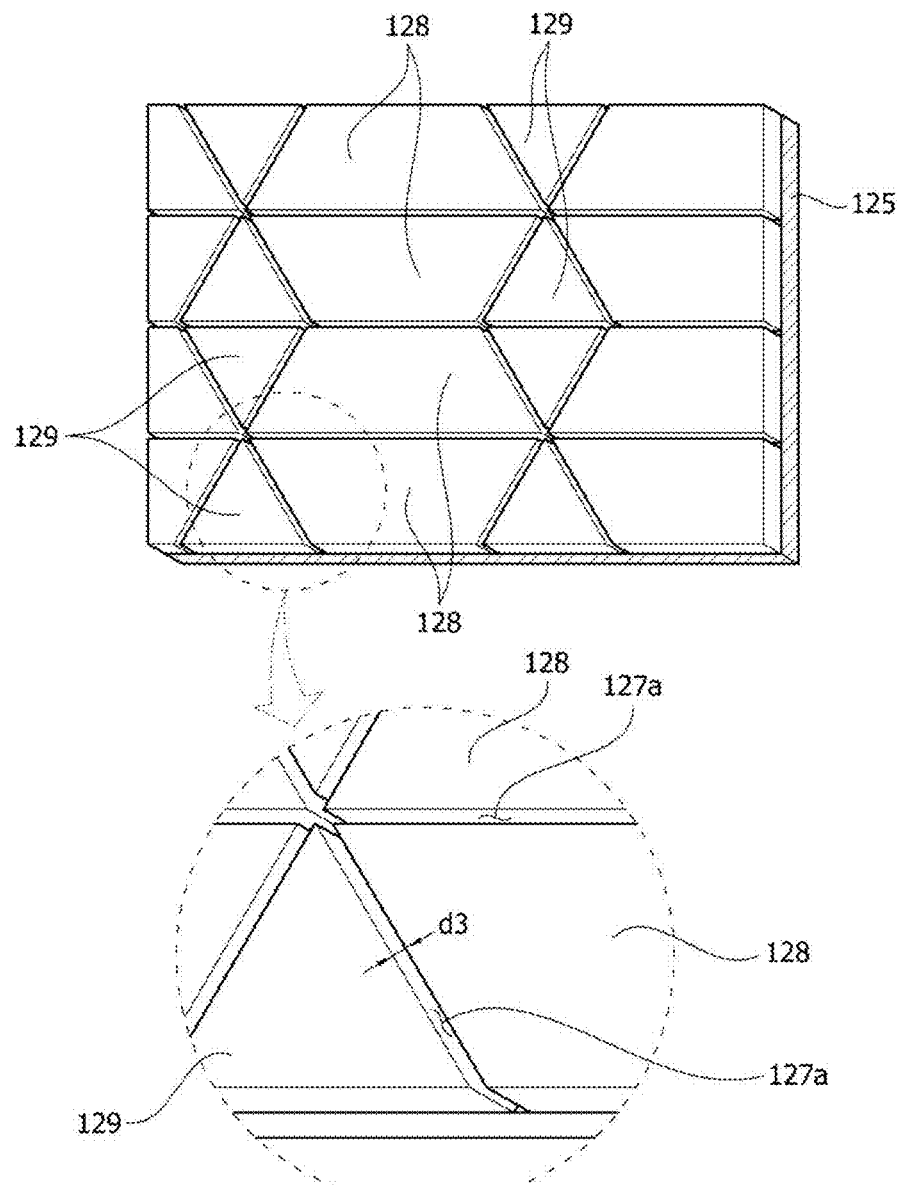
FIG. 12 is a view illustrating a base film, a plurality of first unit optical films, and a plurality of second unit optical films of the vehicular lamp according to the embodiment.

FIG. 11 is a view illustrating a lens portion disposed in a vehicular lamp according to still another embodiment, and FIG. 12 is a view illustrating a base film, a plurality of first unit optical films, and a plurality of second unit optical films of the vehicular lamp according to the embodiment.

When the lens portion 100b is described with reference to FIGS. 11 and 12, components which are the same as those of the lens portion 100 or 100a are described with numerals which are the same as those of the components of the lens portion 100 or 100a, and specific descriptions thereof will be omitted.

The lens portion 100b may be formed by injection molding through an IML method using a mold.

The lens portion 100b may include the body 110 and the film portion 120b.

That is, there is a difference in a shape of the film portion between the lens portion 100b and the lens portion 100 and 100a according to different embodiments.

Meanwhile, referring to FIG. 12, the film portion 120b of the lens portion 100 may include the base film 125, the plurality of first unit optical films 128, and the plurality of second unit optical films 129 which are disposed apart from each other on one side of the base film 125.

Here, the first unit optical films 128 and the second unit optical films 129 may form a three-dimensional image like the unit optical films 126. For example, the patterns 123, 124, or 124a configured to form a three-dimensional image may be formed on at least one of one side and the other side of the optical film body 122 in each of the first unit optical films 128 and the second unit optical films 129.

In addition, the first unit optical films 128 and the second unit optical film 129 may be disposed apart from each other by a predetermined separation distance d3.

Therefore, slits 127a may be formed between the first unit optical films 128 and the second unit optical films 129. Here, the slits 127a may be formed to have the predetermined separation distance d3 in consideration of a delamination phenomenon as described above.

As illustrated in FIG. 12, the first unit optical film 128 may be formed in a trapezoidal shape, and the second unit optical film 129 may be formed in a triangular shape. Therefore, the film portion 120b may be formed such that the first unit optical films 128 and the second unit optical films 129 are disposed on the base film 125 to form the slits 127a.

In the film portion 120b, the first unit optical film 128 is formed in a trapezoidal shape and the second unit optical film 129 is formed in a triangular shape as an example, but the present invention is not limited thereto. For example, the unit optical films having various shapes such as a pentagonal shape and a hexagonal shape may also be used in the film portion 120b in consideration of a shape of the body 110.

In addition, the film portion 120b may also include only any one of the first unit optical film 128 and the second unit optical film 129 or may additionally include a third unit optical film (not shown).

Meanwhile, as illustrated in FIG. 11, the lens portion 100b may further include the adhesive layer 130, the protection film 140, the reflective layer 150, and the oxidation prevention film 160.

Hereinafter, a manufacturing method S1 of the lens portion using an IML method will be described with reference to FIGS. 13 and 14. When the manufacturing method is described, the components of the lens portion 100, 100a, or 100b of the vehicular lamp 1 are described with the numerals which are the same as those of the components of the previous descriptions, and specific descriptions will be omitted.

The lens portion manufacturing method S1 may include disposing the optical film on the base film to form the film portion (S10), shaping the film portion (S20), cutting the film portion (S30), inserting the film portion into a mold (S40), applying a resin to form the body (S50), and outputting the body (S60).

In S10 in which the optical film is disposed on the base film to form the film portion, the optical film 121 may be disposed on one side of the base film 125 to form the film portion 120. Here, the optical film 121 may be formed on the base film 125 through a printing method.

In addition, the film portion 120a or 120b may also be used instead of the film portion 120 according to another embodiment.

In addition, the protective film 140 and the like may also be further disposed on one side of the film portion 120.

In S20 in which the film portion is shaped, the film portion 120 may be formed using heat and the like. That is, it is preferable that a shape of the film portion 120 be formed in consideration of a shape of the lens portion 100.

In S30 in which the film portion is cut, one region of the film portion 120 may be cut in consideration of the shape of the lens portion 100 as illustrated in FIG. 11.

In S40 in which the film portion is inserted into the mold, the cut film portion 120 is inserted into a mold 10.

In S50 in which the resin is applied to form the body, the resin may be applied on one side of the film portion 120 which is inserted into the mold 10 to form the body 110.

However, before the resin is applied to form the body 110, the adhesive layer 130 may be further disposed on the film portion 120.

In S60 in which the body 110 is output, the lens portion 100 formed of the body 110 and the film portion 120 is output from the mold 10.

Accordingly, the lens portion 100, 100a, or 100b may be formed through the IML method through the above-described process.

Figure 15:
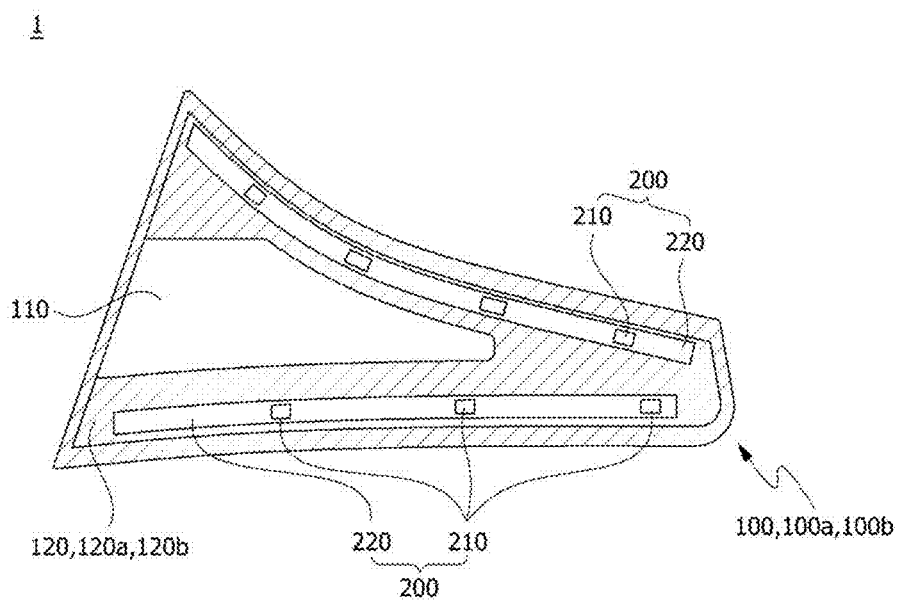
FIG. 15 is a view illustrating the light source portion installed in the lens portion of the vehicular lamp according to the embodiment.

Referring to FIGS. 1 and 15, a vehicle (not shown) according to the embodiment may include the vehicular lamp 1 and a housing 2.

The vehicular lamp 1 is disposed in the housing 2, and thus the vehicular lamp 1 may be installed in a vehicle using the housing 2. In addition, the housing 2 may be formed in various shapes in consideration of a structure of the vehicle.

Here, the vehicular lamp 1 may include the lens portion 100, 100a, or 100b and the light source portion 200. In addition, the lens portion 100 may be formed by the injection molding through the IML method using the mold 10.

Here, the body 110 of the lens portion 100, 100a, or 100b may be formed to have at least one curved surface.

Figure 13:
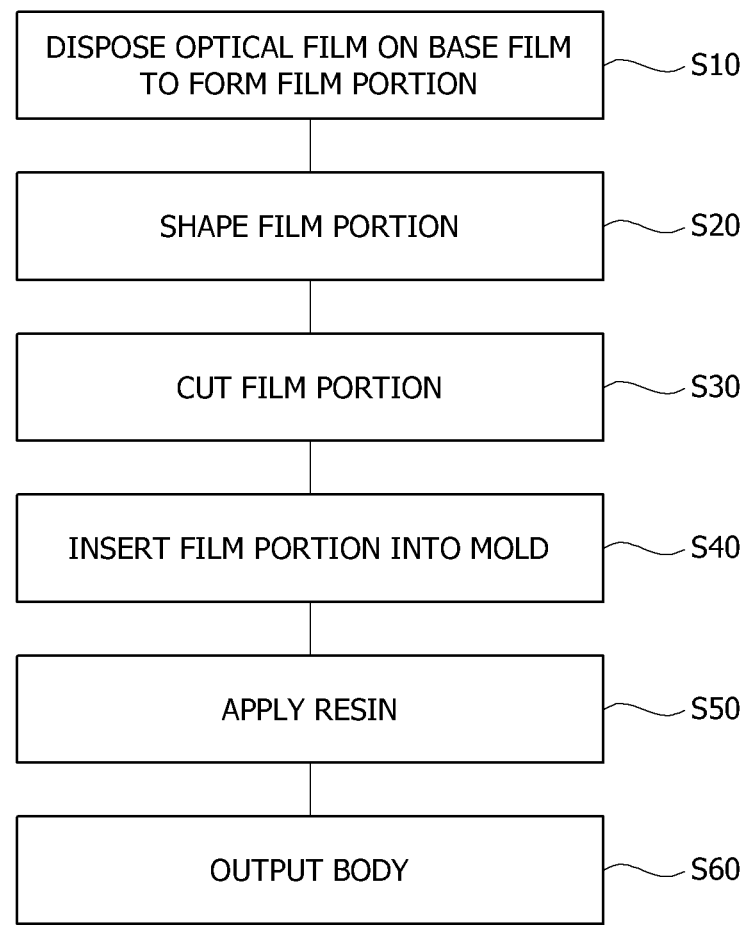
FIG. 13 is a block diagram for describing a process of manufacturing the lens portion of the vehicular lamp according to the embodiment.

As illustrated in FIG. 13, the light source portion 200 may be disposed on at least any one location of one side and the other side of the body 110. The light source portion 200 may include the light source 210 and the PCB 220.

An LED may be used as the light source 210. In addition, the light source 210 may be disposed on the PCB 220 to receive power.

Therefore, light emitted by the light source portion 200 transmits through the body 110 of the lens portion 100, 100a, or 100b and is emitted toward the film portion 120, 120a, or 120b. Therefore, the vehicle (not shown) can form a three-dimensional image through the film portion 120, 120a, or 120b of the vehicular lamp 1.

Accordingly, the vehicular lamp 1 of the vehicle may form the three-dimensional image using the film portion 120, 120a, or 120b and may also enhance a spatial utilization because the light source 210 is installed on one side of the body 110. Therefore, a degree of design freedom of the vehicular lamp 1 can also be enhanced.

While the invention has been shown and described with reference to certain exemplary embodiments thereof, it will be understood by those skilled in the art that various changes and modifications may be made therein without departing from the spirit and scope of the invention as defined by the appended claims. In addition, it should be interpreted that the differences related to the changes and the modifications fall within the scope of the present invention defined by the appended claims.

REFERENCE NUMERALS

1: VEHICULAR LAMP 2: HOUSING
100, 100A, 100B: LENS PORTION 110: BODY
120, 120A, 120B: FILM PORTION 121: OPTICAL FILM
125: BASE FILM 126: UNIT OPTICAL FILM
140: PROTECTION FILM 150: REFLECTIVE LAYER
160: OXIDATION PREVENTION FILM
200: LIGHT SOURCE PORTION 210: LIGHT SOURCE

The invention claimed is:

1. A vehicular lamp comprising:
a lens portion; and
a light source portion configured to emit light toward the lens portion,
wherein:
the lens portion includes a body including at least one curved surface and a film portion disposed on one side of the body and configured to form a three-dimensional image using the light;
the film portion includes a plurality of unit optical films configured to form the three-dimensional image, and a base film interposed between the unit optical film and the body;
the plurality of unit optical films are disposed apart from each other by a predetermined separation distance (d2) to form a slit between the unit optical films, and
wherein a separation distance (d2) between the unit optical films to form the slit on the basis of a width (W) of the unit optical film is in a range of 0.01×W to 0.05×W, wherein W is the width of the unit optical film and d2 is the separation distance of the unit optical films.

2. The vehicular lamp of claim 1, wherein the unit optical film is printed on one side of the base film.

3. The vehicular lamp of claim 1, wherein patterns configured to form the three-dimensional image are formed on at least any one of one side and the other side of the unit optical film.

4. The vehicular lamp of claim 3, wherein the plurality of patterns are disposed apart from each other by a predetermined separation distance (d).

5. The vehicular lamp of claim 1, wherein:
patterns configured to form the three-dimensional image are formed on each of one side and the other side of the unit optical film; and
the patterns formed on the other side are obliquely formed at a predetermined angle (θ) with respect to a longitudinal direction of the patterns formed at one side thereof.

6. The vehicular lamp of claim 5, wherein the plurality of patterns are disposed apart from each other by a predetermined separation distance (d1).

7. A vehicular lamp comprising:
a lens portion; and
a light source portion configured to emit light toward the lens portion,
wherein:
the lens portion includes a body having at least one curved surface and a film portion disposed on one side of the body and configured to form a three-dimensional image using the light;
the film portion includes a plurality of first unit optical films configured to form the three-dimensional image, a plurality of second unit optical films configured to form the three-dimensional image, and a base film;
the first unit optical film and the second unit optical film are disposed apart from each other by a predetermined separation distance (d3) on one side of the base film, and
wherein:
patterns configured to form the three-dimensional image are formed on one side and the other side of each of the first unit optical film and the second unit optical film; and
the patterns formed on the other side are obliquely formed at a predetermined angle with respect to a longitudinal direction of the patterns formed on one side thereof.

8. The vehicular lamp of claim 7, wherein the first unit optical film disposed on the one side of the base film is formed in at least one shape among a triangular shape, a rectangular shape, and a trapezoidal shape.

9. The vehicular lamp of claim 7, wherein patterns configured to form the three-dimensional image are formed on at least one of one side and the other side of each of the first unit optical film and the second unit optical film.

10. The vehicular lamp of claim 9, wherein the plurality of patterns are disposed apart from each other by a predetermined separation distance (d).

11. A vehicular lamp comprising:
a lens portion; and
a light source portion configured to emit light toward the lens portion,
wherein:
the lens portion includes a body having at least one curved surface and a film portion disposed on one side of the body and configured to form a three-dimensional image using the light; and
the lens portion is injection molded through in-mold labelling (IML) using a mold,
wherein the film portion includes:
an optical film configured to form the three-dimensional image; and
a base film interposed between the optical film and the body,
wherein an adhesive layer is further interposed between the base film and the body to improve adhesion by which the base film is adhered to the body, a protection film is disposed on one side of the optical film and configured to protect the optical film, and a reflective layer is further interposed between the optical film and the protection film to improve a reflectivity of the vehicular lamp to enhance a light efficiency of the light.

12. The vehicular lamp of claim 11, wherein patterns configured to form the three-dimensional image are formed on at least any one of one side and the other side of the optical film.

13. The vehicular lamp of claim 11, wherein an oxidation prevention film is further interposed between the reflective layer and the protection film to prevent oxidation of the reflective layer which contains aluminum or silver.

14. The vehicular lamp of claim 13, wherein the oxidation prevention film contains silicon or stainless steel.

* * * * *